United States Patent [19]

Albright et al.

[11] Patent Number: 4,794,544
[45] Date of Patent: Dec. 27, 1988

[54] METHOD AND APPARATUS FOR AUTOMATICALLY INDEX TESTING A KAPLAN TURBINE

[75] Inventors: Douglas J. Albright, Byron, Ill.; George H. Mittendorf, Jr., Farnham Common, England

[73] Assignee: Woodward Governor Company, Rockford, Ill.

[21] Appl. No.: 31,110

[22] Filed: Mar. 26, 1987

[51] Int. Cl.[4] .................... G06F 15/20; G06F 15/46
[52] U.S. Cl. .................................. 364/494; 290/43; 364/550; 415/148
[58] Field of Search ........................ 364/492-494, 364/550-552, 578, 495, 853, 856; 73/112; 60/364, 398; 290/43, 52; 416/17; 405/78; 415/148

[56] References Cited

U.S. PATENT DOCUMENTS

| | | | |
|---|---|---|---|
| 3,483,364 | 12/1969 | Leeson, Jr. .................... | 364/853 |
| 3,911,286 | 10/1975 | Uram ............................... | 364/495 |
| 3,932,058 | 1/1976 | Harner et al. ................. | 415/148 |
| 4,400,783 | 8/1983 | Locke, Jr. et al. ............ | 364/483 |
| 4,427,896 | 1/1984 | Waldron ......................... | 364/495 |
| 4,490,808 | 12/1984 | Jasmin ............................ | 364/495 |
| 4,517,468 | 5/1985 | Kemper et al. ............... | 290/52 |
| 4,674,279 | 6/1987 | Ali et al. ........................ | 290/43 |
| 4,683,718 | 8/1987 | Larsson ......................... | 60/398 |

OTHER PUBLICATIONS

L. H. Sheldon, "Field Testing and Optimising Efficiency of Hydro Turbines", Water Power & Dam Construction, Jan. 1982, pp. 22-28.
G. P. Erickson and J. C. Graber, "Measurment of Real Time Turbine Efficiency", Water Power & Dam Construction, Sep. 1984, pp. 15-17.
Index Metod of Testing Supplement to PTC-18, 1949 ASME Test Code for Hydraulic Prime Movers, prepared by the American Society of Mechanical Engineers.
In re Venner and Bowser (120 U.S.P.Q 192), CCPA 1958.

Primary Examiner—Gary Chin
Assistant Examiner—Kevin J. Teska
Attorney, Agent, or Firm—Leydig, Voit & Mayer

[57] ABSTRACT

Method and apparatus for automatically determining the set of optimal operating angles for the variable pitch blades of a Kaplan-type turbine which has movable gates and is controlled by a governor and an electronic 3D cam. The governor controls the gates so as to maintain the turbine at a predetermined setpoint power generation level, and on-cam values of particular operating parameters of the turbine are measured. When evaluation of the measured data indicates that the turbine is in a steady-state condition, the blades are moved through a series of incremental off-cam variations in pitch. Following each incremental pitch variation of the blades, the governor repositions the gates to return the turbine to the predetermined setpoint power generation level. The operation of the turbine is then monitored, and values of particular operating parameters are measured at the new gate-blade operating point once the turbine has returned to steady-state. An efficiency value is computed for each of the measured operating points and are compared to identify a peak efficiency value.

29 Claims, 8 Drawing Sheets

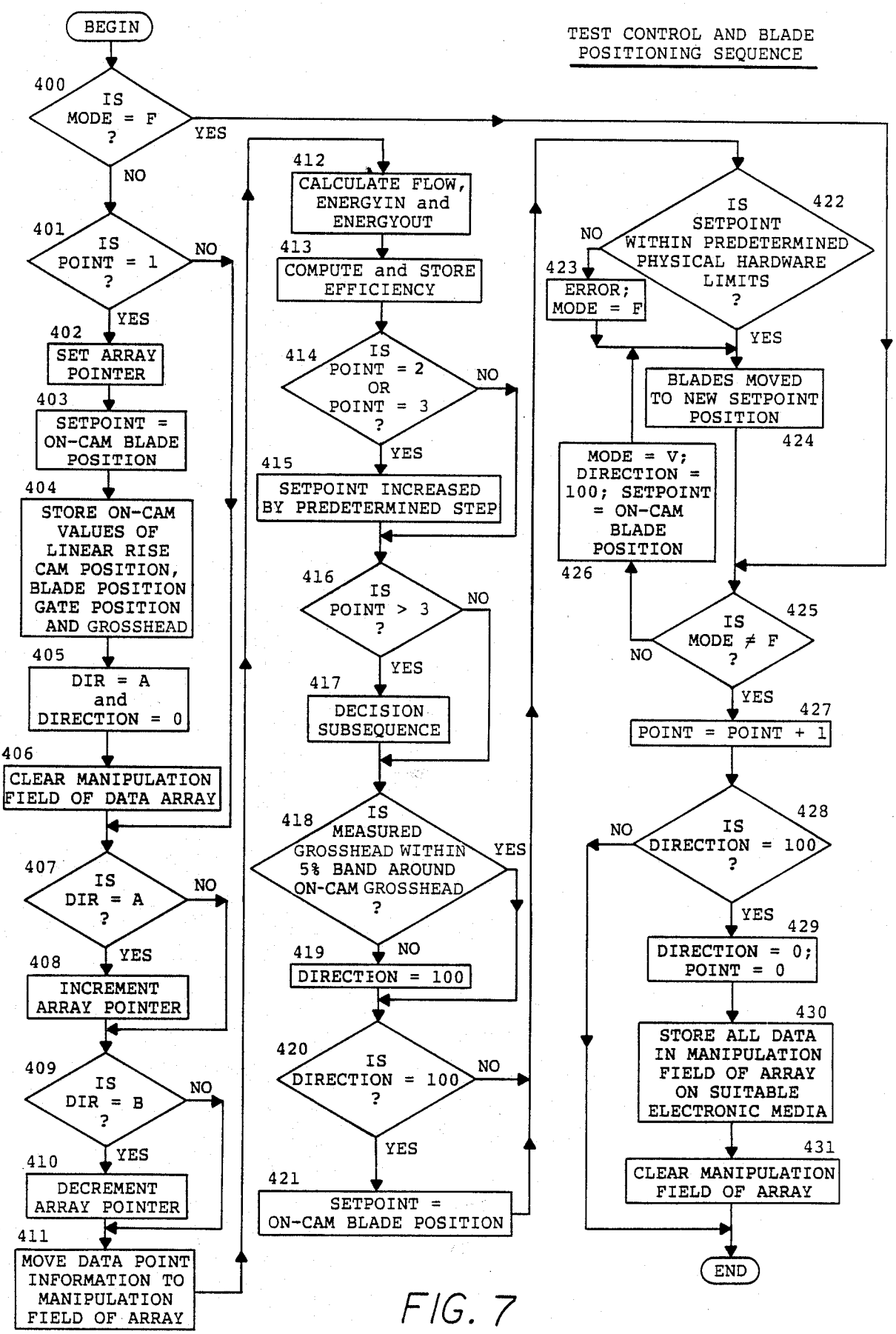

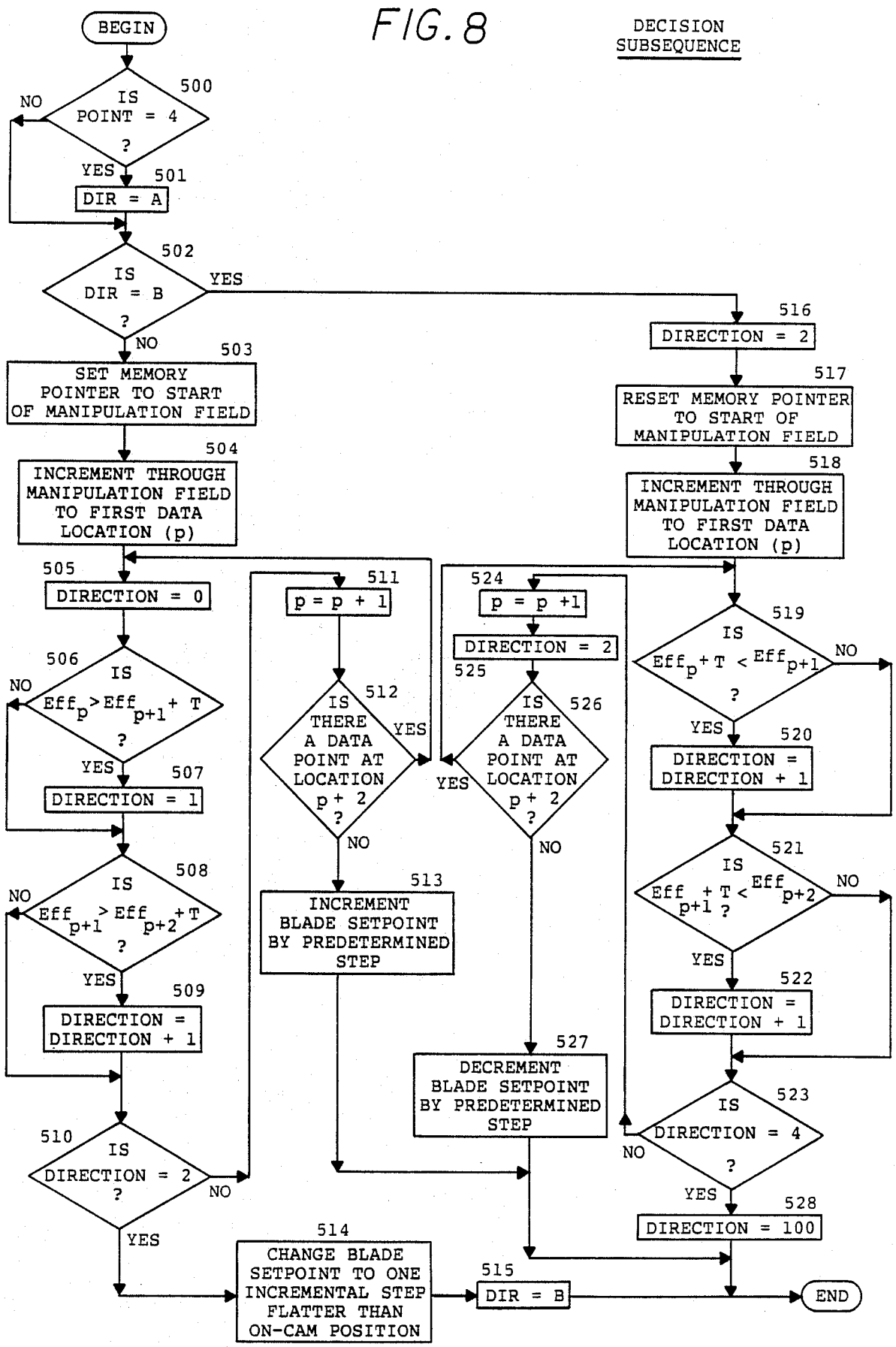
FIG. 8 — DECISION SUBSEQUENCE

METHOD AND APPARATUS FOR AUTOMATICALLY INDEX TESTING A KAPLAN TURBINE

TECHNICAL FIELD

The present invention relates generally to methods and apparatuses for testing to determine the efficiency of turbines, and, more particularly, to a method and apparatus for automatically index testing a Kaplan turbine.

BACKGROUND ART

Kaplan turbines are used in many hydroelectric installations, and are distinguishable from other types of turbines primarily in that they have variable pitch blades which may be adjusted during operation to obtain maximum operating efficiency from existing conditions of gross headwater level and gate position. It is well known in the art to use a governor to automatically control the gates of the turbine (and thereby the flow of water to the blades) in order to achieve and maintain predetermined setpoint power generation levels, and to use an electronic microprocessor-based 3D cam to position the variable pitch blades in response to the gate position and gross headwater level in order to obtain maximum operating efficiency at the desired power generation level.

A turbine vendor generally provides an initial 3D cam surface (as a function of head and set gate) to a user, installed in the electronic 3D cam. This initial 3D cam surface is developed based on model tests conducted by the vendor under simulated conditions, and therefore, merely constitutes an estimate of what the turbine's actual efficiency profile is expected to be when it is built and run in its actual operating environment. If it is desired to refine the initial 3D cam surface to accurately reflect the turbine's true efficiency profile, the turbine can be index tested, and the data collected during the index test used to define a new optimum 3D cam surface (i.e., to program a new memory chip for the 3D cam with the new surface profile). Periodic index testing of the turbine is also desirable in order to update the 3D cam to reflect changes in the turbine or its environment.

It has been conservatively estimated that through index testing of turbines, and the resultant upgrading of turbine 3D cam surfaces, an average 1% increase in turbine operating efficiencies can be achieved. Thus, millions of dollars worth of lost electrical power can be reclaimed by identifying and correcting factors that degrade turbine efficiency. Moreover, index testing provides useful information for identifying and correcting turbine deterioration, minimizing cavitation, optimizing turbine maintenance schedules and modeling operating envelopes for Kaplan turbines. In addition, index test results can be used in larger schemes to optimize aggregate operating efficiency for a number of units. More specifically, maximum efficiency can be realized in facilities that operate several turbines by identifying the generation level (for the existing head) at which maximum efficiency can be achieved for each turbine. Thus, individual units can be operated at their particular efficiency peaks (when power demands from the grid allow operating at less than full output).

Despite the numerous benefits provided by index testing, such tests are often not performed on a turbine at commissioning (i.e., to refine the initial 3D cam), and are only occasionally, if ever, performed on a unit during its lifetime. The reason for this is that the classical index test procedure -- defined in the 1952 *Index Method of Testing* supplement to PTC-18 (the Power Test Code from the ASME) -- requires extensive manpower (from 4 to 14 people, depending on unit complexity and layout) and interruptions to normal unit service. In addition, classical index test methods cause time-consuming delays due to correlating changes in unit generating level with the power dispatcher, and also due to waiting for water levels to stabilize after flow changes are made.

These deficiencies, which have been a deterrent to greater use of index testing, will be better appreciated from the following simplified description of a classical index test. In a classical index test, the blades are manually positioned at a series of blade tilt angles, the gates are set at several positions for each blade position, and turbine operating parameter measurements are made (manually) at each gate-blade operating point. Since both the blades and gates are being moved independently, different power generation levels and discharge flow rates result at each test point. Consequently, sufficient time has to be allowed for tailwater levels to stabilize after each change in gate and/or blade position, and the changes in generation have to be coordinated with the power dispatcher so that the total power to the grid can be held constant.

SUMMARY OF THE INVENTION

It is a primary object of the present invention to provide an improved method and apparatus for automatically identifying, for each gross headwater level and gate position, the optimal operating angle for the blades of a Kaplan-type turbine that will deliver the peak generating efficiency.

It is a further object of this invention to provide an improved method and apparatus for automatically collecting index test turbine performance data during normal on-line unit operation, thus avoiding the usual downtime required for conventional index testing.

Another object of this invention is to provide such an improved method which can be economically performed, with a minimum of manpower as compared to a classical index test, and yet results in accurate measurement of several turbine performance parameters for use in refining the existing three dimensional surface contained in the electronic 3D cam.

A further object of the present invention is to provide an improved index test apparatus which can be economically manufactured and installed, and yet accurately and automatically measures several turbine performance parameters for use in refining the turbine's existing electronic 3D cam.

Other objects and advantages of the invention will be apparent from the following detailed description.

In accordance with the present invention, there is provided a method of automatically determining, for each gross headwater level and gate position, the optimal operating angle providing peak generating efficiency for the variable pitch blades of a Kaplan-type turbine having movable gates, said turbine being controlled by a governor and an electronic 3D cam, said method comprising the steps of running the turbine on-cam at, and using the governor to control the positions of the gates so as to maintain the turbine at, a predetermined setpoint power generation level; measuring on-cam values of particular operating parameters of the turbine; evaluating the measured data to determine whether the turbine is operating in a steady-state condition; when steady-state operation has been achieved, moving the blades of the turbine through a series of incremental offcam variations in pitch in both the flatter blade angle and steeper blade angle directions; after making each incremental variation in the pitch of the blades, allowing the governor to reposition the gates so as to return the power generation level of the turbine to the setpoint, monitoring the operation of the turbine to determine when it has returned to steady-state and then measuring values of the particular operating parameters at the new gate-blade operating point; computing the efficiency value corresponding to each of the measured operating points; and comparing the efficiency values of the measured operating points to identify a peak value.

BRIEF DESCRIPTION OF THE DRAWINGS

FIG. 7 is a flow chart representation of the test control and blade positioning sequence of FIG. 4.

FIG. 8 is a flow chart representation of the decision subsequence of FIG. 7.

DESCRIPTION OF THE PREFERRED EMBODIMENTS

While the invention will be described in connection with certain preferred embodiments, it will be understood that it is not intended to limit the invention to these particular embodiments. On the contrary, it is intended to cover all alternatives, modifications, and equivalents included within the spirit and scope of the invention as defined by the appended claims.

Figure 1:
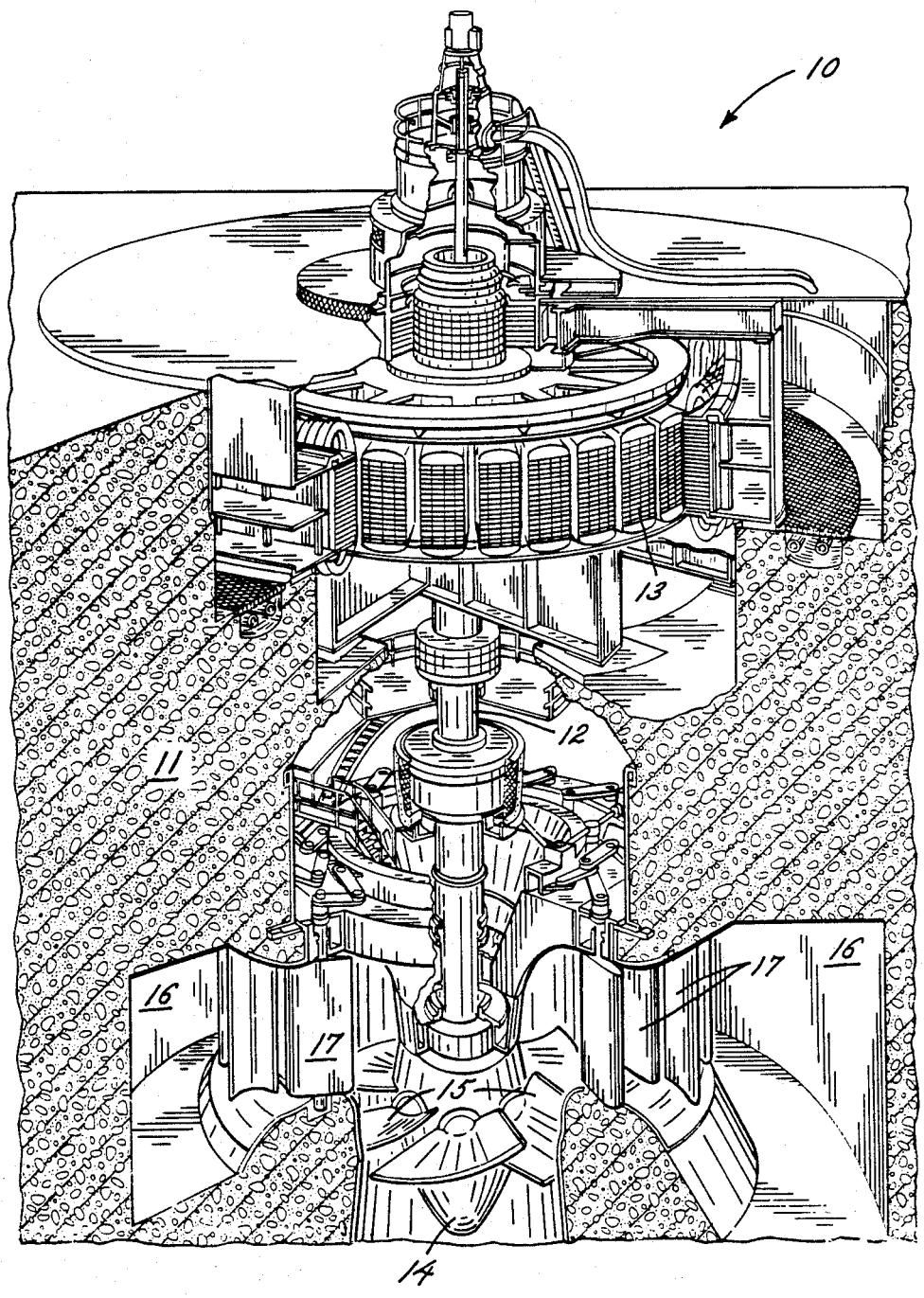
FIG. 1 is a sectional view of a Kaplan turbine in a hydroelectric installation.
Figure 2:
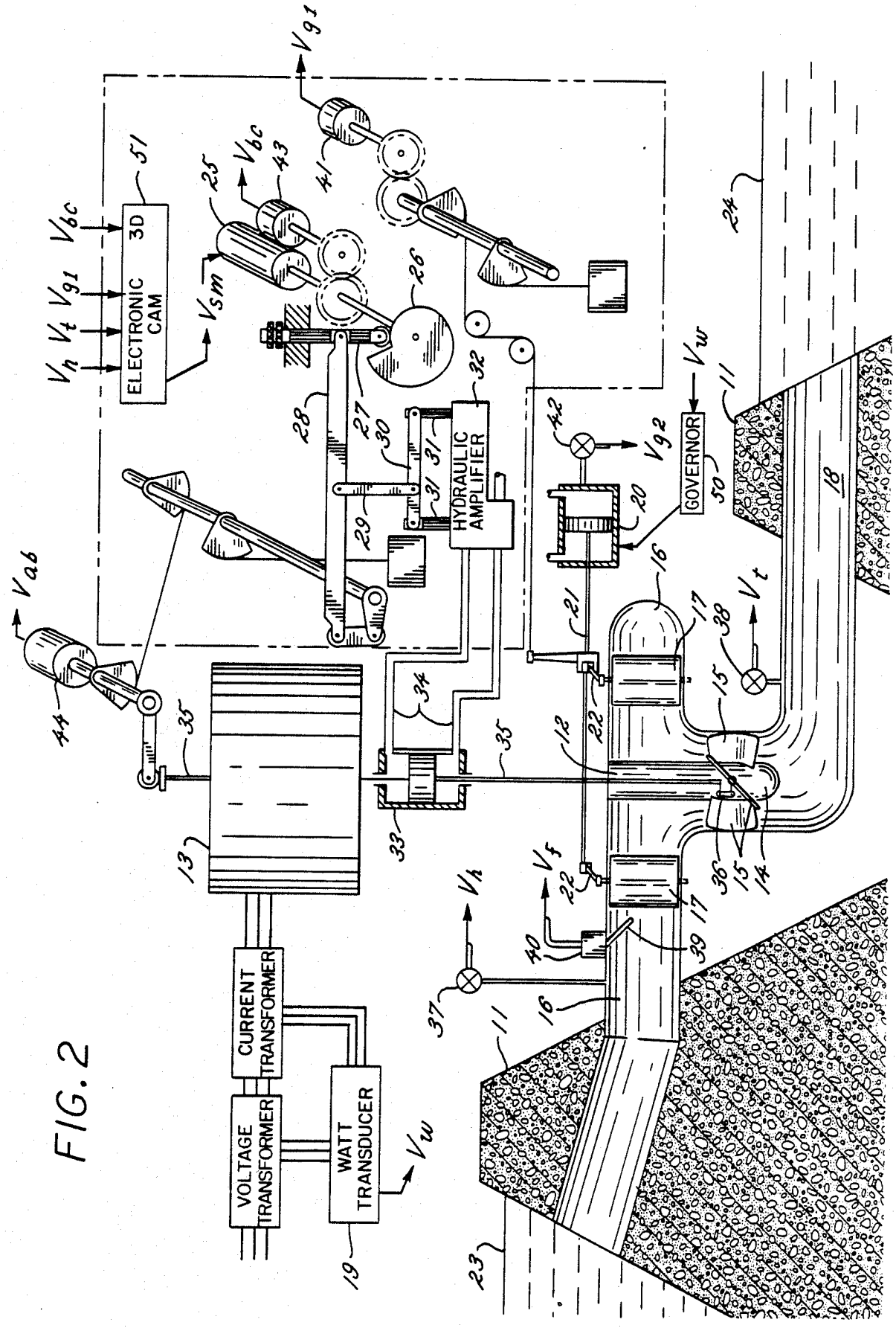
FIG. 2 is a diagrammatic view of the Kaplan turbine of FIG. 1 with governor mounted equipment and with transducers and potentiometers for measuring particular operating parameters.

Turning now to the drawings, and referring first to FIG. 1, there is shown a Kaplan-type turbine 10 installed in the concrete structure 11 of a hydroelectric facility. The turbine has a vertical main shaft 12 interconnecting a rotor 13 of an alternating current generator and a runner 14, which has attached to it a plurality of variable pitch blades 15. The concrete structure 11 has a water inlet structure (comprising a spiral casing 16, which opens into a substantially circular chambrr surrounding the runner 14 and blades 15 of the turbine, and a plurality of movable gates 17 which regulate the flow of water across the blades 15) and a water outlet passage 18 (FIG. 2).

As is well known in the art, governor 50 is used to automatically control the gates 17 so as to regulate the flow of water to the blades 15 and thereby control the power output of the turbine. More specifically, the governor 50, by means of a watt transducer 19, which measures output current and voltage from the generator and provides an output signal $V_w$ calibrated in megawatts, monitors the power generation level of the turbine. It then compares this with a predetermined desired setpoint generation level, and, utilizing a feedback system, adjusts the gates 17 (i.e., pushes the gates closed if the generation level is too high or opens them up if the generation level is too low) to match the output generation level with the desired level. The gates rre physically moved, in response to signals generated by the governor 50, by means of a gate servo motor 20, which is coupled to the gates 17 through linkage members 21, 22.

As is further well known in the art, the blades 15 are controlled by means of an electronic 3D cam. An example of an electronic 3D cam is described in U.S. Pat. No. 3,483,364. This electronic 3D cam contains a three dimensional surface that defines the optimal blade position as a function of available head level and gate position. Measurement of head level is cccomplished by one of two methods: the first is a single differential transducer connected across the turbine from the spiral case 16 to the water outlet passage 18 (FIG. 2), and the second comprises separate measurements of headwater level 23 and tailwater level 24 by appropriate transducers and computation of the gross headwater level therefrom. It will be noted that "gross headwater", as used herein, is meant to cover both the simple head level calculation (gross headwater = headwater-tailwater), and the more complicated calculation taking into consideration losses caused by friction, trashracks, etc. Thus, in response to input signals corresponding to the available head level and the position of the gates 17 (set by the governor 50 as explained previously), the electronic 3D cam 51 generates a stepping motor control signal $V_{sm}$ in order to move the blades 15 so that the turbine operates at its peak efficiency for the gross headwater level/power generation level operating condition. The stepping motor control signal $V_{sm}$ drives a stepping motor 25 which rotates an output cam 26. While the output cam 26 can be of various shapes, it is preferably a linear rise cam having a rise which is linearly proportional to angular position. The compound shape of the 3D cam/output cam combination is then simply controlled by the values stored in associated locations in the lookup table of the 3D cam. This allows the compound cam shape to be changed at will simply by changing the memory element containing the lookup table.

Returning to the turbine control, the position of the output cam 26 is translated through an abutting roller arm 27, a series of linkage mechanisms (28, 29, 30, 31) and a hydraulic amplifier 32, into a pressurized fluid (e.g., oil) signal which acts on a blade servo motor 33 through connection lines 34. The blade servo motor 33, in turn, moves restoring tubes 35 and thereby, through a linkage mechanism 36, moves the blades 15.

Particular operating parameters of the turbine (namely, headwater level, tailwater level, gate position, blade position, linear rise blade cam position, power generation level and flow rate through the turbine) are measured by means of transducers and/or potentiometers located about the turbiee and the hydroelectric facility. As mentioned previously, the power generation level of the turbine is measured by means of a watt transducer 19 which measures output current and voltage from the generator and provides an output signal $V_w$ calibrated in megawatts.

A headwater pressure transducer 37 positioned in the water inlet flow path 16 measures the headwater level and generates a signal $V_h$ corresponding thereto. Similarly, a tailwater pressure transducer 38 positioned in the water outlet passage 18 measures the tailwater level and generates a corresponding signal $V_t$.

The well-known Winter-Kennedy method may be used to determine the water flow rate through the turbine. Specifically, this method is carried out by placing a pair of Winter-Kennedy taps 39 (only one is shown schematically in FIG. 2) in the spiral flow case 16 and by placing a differential pressure transducer 40 across these taps to generate a signal $V_f$ corresponding to the measured differential pressure. Although Winter-Kennedy is the preferred method, many others are available and can be used, including the Joseph Peck method, the calibrated Wier method, the current meter method, the pitot tube method, etc.

The position of the gates 17 is determined by means of a potentiometer 41 coupled to gate linkage members 21, 22. A signal $V_{g1}$ is produced by this potentiometer which corresponds to the gate position. An additional transducer 42 can be installed on the gate servo motor 20 to provide a second signal $V_{g2}$ corresponding to the position of the gates 17, and this second gate position signal $V_{g2}$ can be compared with the gate position signal $V_{g1}$ generated by the potentiometer 41 in order to determine hysteresis in the governor feedback system.

A potentiometer 43 is coupled to the linear rise blade (i.e., output) cam 26 to measure the position thereof (i.e., to measure the blade position specified by the 3D cam). A signal $V_{bc}$ is generated to correspond with this position. A transducer 44 is coupled to the oil head of the blade servo motor 33 by means of the restoring tubes 35 to measure the actual blade position and to generate a signal $V_{ab}$ corresponding to the actual blade position. It should be noted that hysteresis of the turbine and the overall accuracy of the blade positioning system can be determined by comparing the difference between the signal $V_{ab}$ generated by the oil head transducer 44 and the signal $V_{bc}$ generated by the linear rise blade cam potentiometer 43 corresponding to the blade position specified by the 3D cam.

Figure 3:
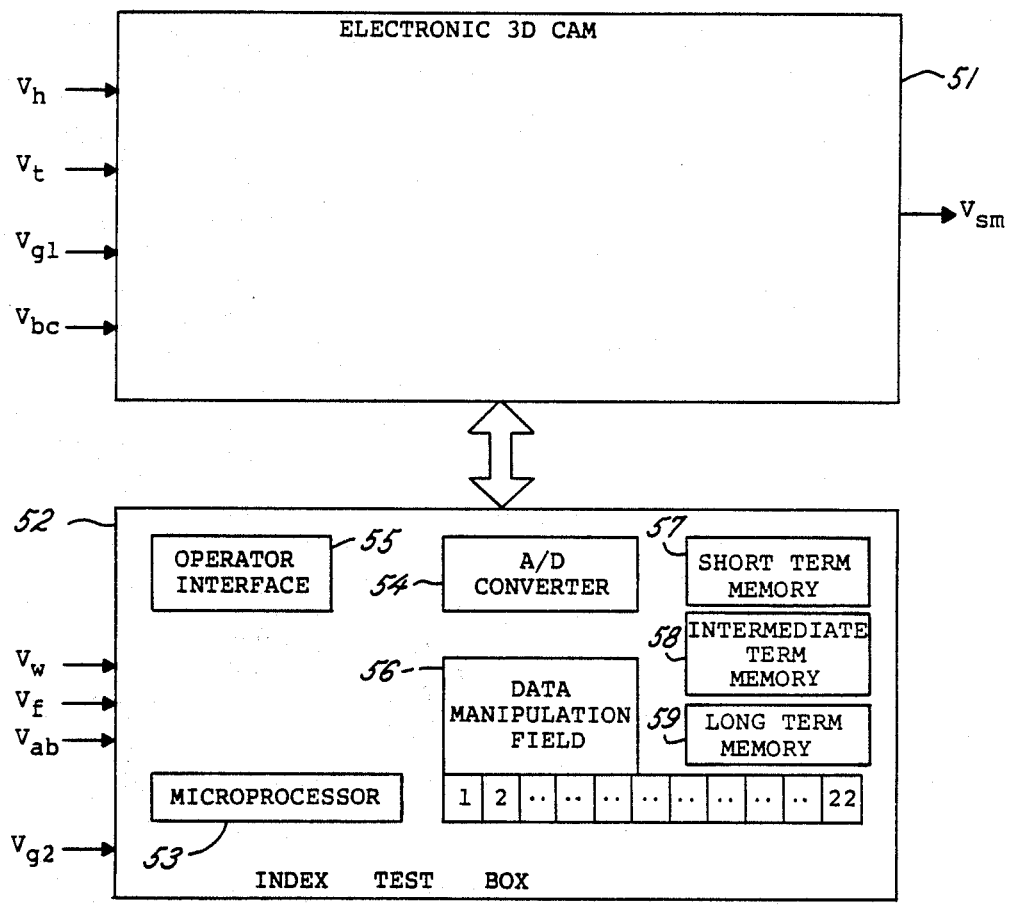
FIG. 3 is a schematic representation of the index test box and the electronic 3D cam, including their inputs and outputs.

As illustrated in FIGS. 2 and 3, an electronic 3D cam 51 receives a number of the signals (namely, $V_h$, $V_t$ and $V_{g1}$) generated by the previously-mentioned transducers/potentiometers, which it responds to, in a well-known fashion, by generating an output signal $V_{sm}$ for driving the stepping motor 25, and ultimately moving the blades 15 to a new desired position (i.e., pitch angle). The linear rise blade cam signal $V_{bc}$ generated by the potentiometer 43 serves as a feedback signal to the 3D cam 51 to indicate when the stepping motor 25 has driven the linear rise blade cam 26 to the appropriate position to achieve the desired blade pitch position.

As further illustrated in FIG. 3, the index test box apparatus 52 also receives signals (namely, $V_w$, $V_f$ and $V_ab$) directly from the transducers/potentiometers. It also interfaces with the electronic 3D cam 51, and thus, takes signals (namely, $V_h$, $V_t$, $V_{g1}$ and $V_{bc}$) directly therefrom. In response to these signals, and in accordance with a sequence of operations programmed into a microprocessor 53, the index test box apparatus 52, interfacing through the electronic 3D cam 51, generates a signal $V_{sm}$ to vary the blades 15 over a closely-controlled series of steps about the original on-cam position, and measures, calculates and stores data at each blade position. The predetermined sequence of operations followed by the microprocessor 53 of the index test box apparatus 52 in conducting an index test (shown in the flowchart representations of FIGS. 4–8) is described in detail hereinafter, and it will be noted that when the microprocessor 53 is programmed to carry out the described sequence, the index test box apparatus 52 comprises means for performing the functions to be described. In addition to the microprocessor 53, the index test box apparatus 52 comprises analog-to-digital converting means 54 for converting the analog signals into digital values; operator interface means 55, including a touch screen, allowing calibration and set-up of the index test box apparatus and for displaying collected data, computed results and data recorded on EPROM chips or other suitable electronic media; a data manipulation field 56 (having a predetermined number of slots (e.g., 22) for data); and short term, intermediate term and long term memory (57, 58, 59) (or means for accessing an outside computer having such memory).

Generally, the index test sequence comprises the steps of running the turbine 10 on-cam at, and using the governor 50 to control the positions of the gates 17 so as to maintain the turbine at, a predetermined setpoint power generation level; measuring on-cam values of particular operating parameters of the turbine; evaluating the measured data to determine whether the turbine is operating in a steady-state condition; when steady-state operation has been achieved, moving the blades 15 through a series of incremental off-cam variations in pitch in both the flatter blade angle and steeper blade angle directions; after making each incremental variation in the pitch of the blades, allowing the governor 50 to reposition the gates 17 so as to return the power generation level of the turbine to the setpoint, monitoring the operation of the turbine to determine when it has returned to steady-state and then measuring values of the particular operating parameters at the new gate-blade operating point; computing the efficiency value corresponding to each of the measured operating points; and comparing the efficiency values of the measured operating points to identify a peak value.

Figure 4:
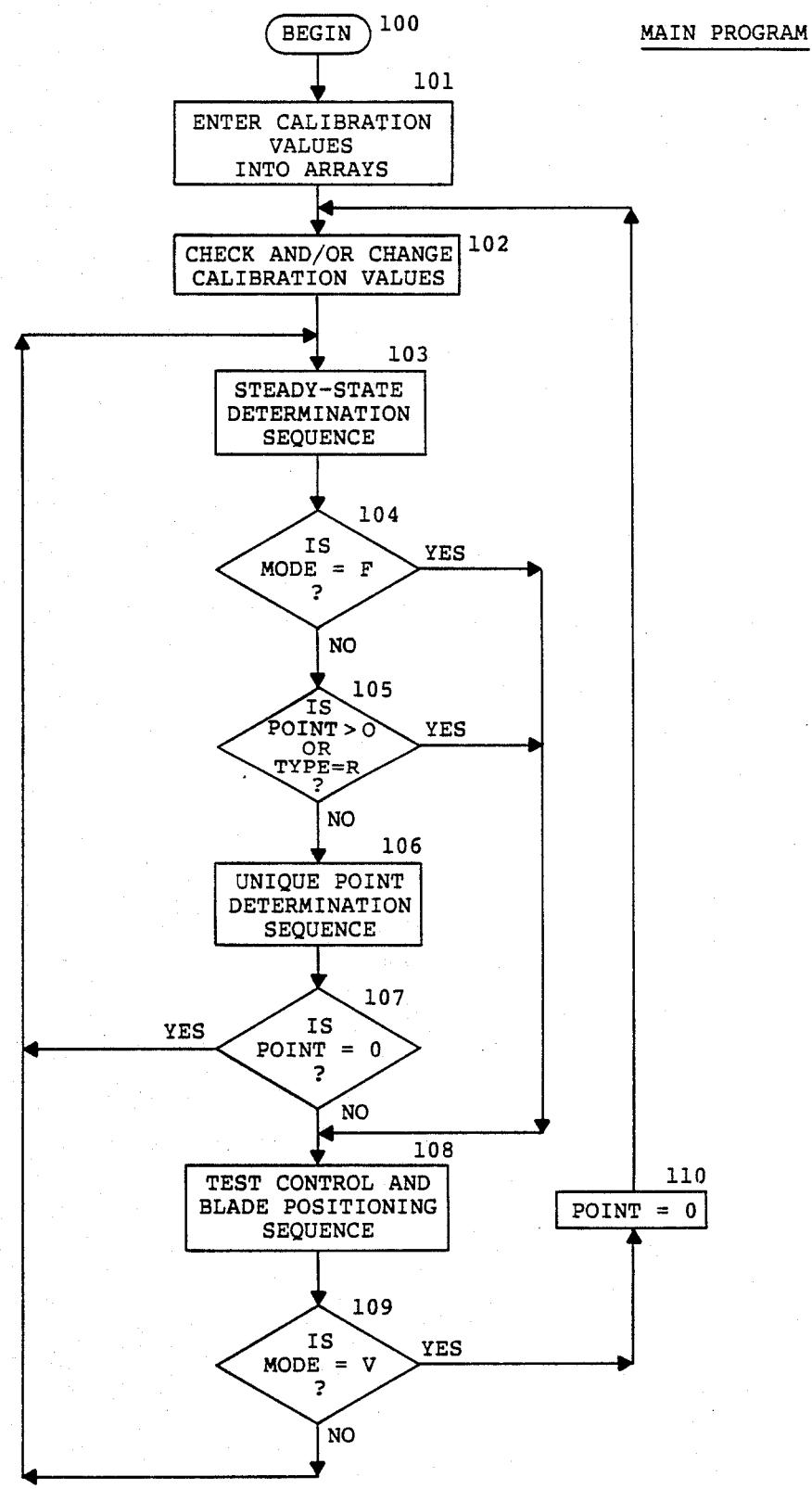
FIG. 4 is a flow chart representation of the main program sequence of operations followed by the inventive apparatus in automatically index testing a Kaplan turbine.
Figure 5:
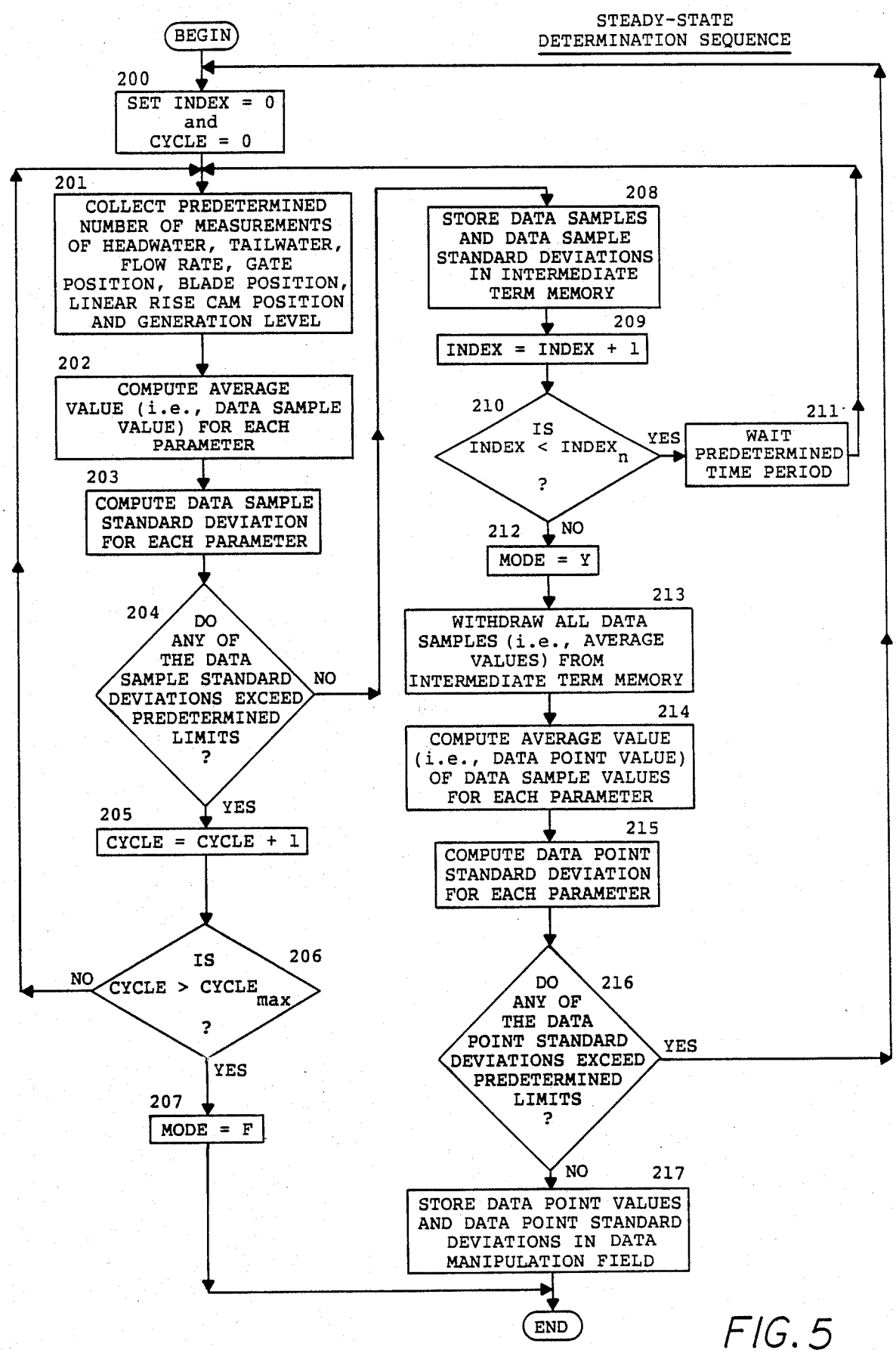
FIG. 5 is a flow chart representation of the steady-state determination sequence of FIG. 4.

More specifically, and with reference to the flow chart representation of FIG. 4, the index test sequence begins at step 100 when an operator activates the index test box apparatus 52. At step 101, calibration values (including constants relating to both the turbine and hydroelectric systems, physical and numerical limits to be used during the index test sequence, and initiation values of various control variables) are entered into arrays in the index test box memory. These constants, control variables and limits will be discussed in greater detail hereinafter as they are encountered in the index test proceuure.

Next, at step 102, the operator interface 55 of the index test box is activated so that an operator, if desired, can check and/or change any of the calibration values entered into the arrays in step 101.

At step 103, the steady-state determination sequence is initiated, which involves the determination of whether the turbine is operating in steady-state condition. This sequence is described in detail with reference to FIG. 5. The first step (200) entails setting two counters (INDEX and CYCL)) to zero. As will become further apparent hereinafter, the CYCLE counter keeps track of the number of data samples which are rejected due to non-steady-state operation of the turbine, and the INDEX counter keeps track of the number of data samples taken and stored which indicate steady-state operation. For each data sample, a predetermined number of measurements of headwater level, tailwater level, flow rate, gate position, blade position, linear rise blade cam position and generation level are collected at step 201 and stored in short term memory 57. These operating parameter measurements are taken using multi-rate sampling techniques, and the number of measurements taken for each data sample (of each parameter) is set during calibration. Accordingly, the predetermined number of measurements (comprising a data sample set) are taken for each operating parameter.

The microprocessor 53 uses the collected data to compute an average value (i.e., a data sample value) for each operating parameter (step 202), and then computes a data sample standard deviation for each operating parameter (step 203). These data sample standard deviations are then compared (at step 204) with predetermined limits set during calibration. If any of the data sample standard deviations exceed the predetermined limits, the entire data sample is rejected, the CYCLE counter is incremented (step 205), and the incremented value of the CYCLE counter is compared to a maximum value ($CYCLE_{max}$) set during calibration (step 206). This maximum value $CYCLE_{max}$ limits the number of times data samples can be rejected, and prevents cavitation noise of the turbine from causing the index test to stall in a cavitation region of operation. If the incremented value of the CYCLE counter exceeds the predetermined maximum value $CYCLE_{max}$, a control variable (MODE) is set equal to "F" (step 207) and the steady-state determination sequence ends. On the other hand, however, if $CYCLE_{max}$ is not exceeded, sampling of the operating parameters is restarted (step 201).

If, at step 204, none of the data sample standard deviations exceed the predetermined limits, the average value (i.e, the data sample value) and the data sample standard deviation for each operating parameter is stored in intermediate term memory 58 (step 208). Then, the INDEX counter is incremented (step 209), signifying that a data sample was taken showing steady-state operation. At step 210, the value of the INDEX counter is compared to a predetermined limit value ($INDEX_n$) which sets the number of successful data samples that should be taken. If the incremented value of the INDEX counter is less than the predetermined value $INDEX_n$, the microprocessor waits a predetermined time period (step 211), and then restarts sampling of the operating parameters (at step 201). Thus, the sequence of steps (201-202-203-204-208-209-210) resulting in measurement and storage of steady-state data samples is repeated until the value of the INDEX counter equals the predetermined limit value $INDEX_n$. Once INDEX=$INDEX_n$ (i.e., once a sufficient number of successful data samples have been taken), the control variable MODE is set equal to "Y" (step 212). Next, at step 213, all of the data samples (i.e., the average values) for each parameter are withdrawn from intermediate term memory 58. The microprocessor then computes the average value (i.e., the data point value) of the individual data sample values for each parameter (step 214), and computes the data point standard deviation for each parameter (step 215). These computed data point standard deviations are then compard with a second set of predetermined limits, and if any of them exceed the values of this second set of predetermined limits, the turbine is deemed to not be in steady-state operation. Consequently, all of the data collected for the relevant gate-blade operating point is rejected, the INDEX connter and the CYCLE counter are both reset to zero (step 200), and the entire steady-state determination sequence begins anew. If, however, none of the data point standard deviations exceed the second set of predetermined limits, the turbine is deemed to be in steady-state operating condition, and the data point values and the data point standard deviations are stored in the data manipulation field 56 (step 217) as the representative values of the measured operating parameters for the relevant gate-blade operating point.

Reverting to FIG. 4, the succeeding step (104) checks the value of the control variable MODE. If MODE="F" (indicating that the present index test should be cancelled), the microprocessor 53 jumps to step 108 in the main program (i.e., to the test control and blade positioning sequence) whereby, as explained in greater detail hereinafter, the blades 15 are returned to the "on-cam" position for the desired power generation level, the current index test is cancelled, the electronic 3D cam 51 is restored to normal on-cam operation and the index test box apparatus 52 trips to an off-line condition. A manual operator entry at step 102 is required to restart the index test box apparatus, should this happen.

If, at step 104, the value of the control variable MODE is not "F", the microprocessor 53 then checks the values of an indicator, POINT, and another control variable, TYPE. The control variable TYPE is set by operator entry at the beginning of a test series (i.e., step 102) to specify the type of test desired. If TYPE="R", repeating index tests are performed (i.e., index tests are performed for all on-cam data points encountered). On the other hand, if TYPE="U", index tests are performed for only "unique" on-cam data points. The indicator POINT indicates when an index test is being run and the index test box 52 is controlling the blades of the turbine (i.e., the turbine is "off-cam"). Moreover, it serves as a counter to indicate the number of off-cam gate-blade operating points that have been tested (and for which data point information has been stored in the data manipulation field 56). At step 105, if the value of POINT=0 (indicating that the turbine is still "on-cam") or the value of TYPE="U" (indicating that a "unique" point index test is desired), then the unique point determination sequence is initiated (step 106). Otherwise, the unique point determination sequence is skipped and the test control and blade positioning sequence begins (step 108).

Figure 6:
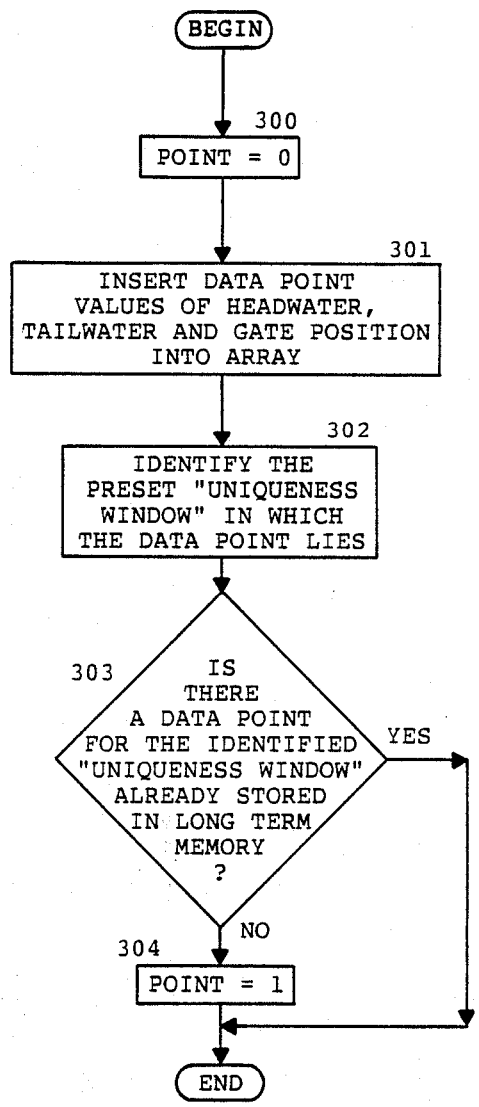
FIG. 6 is a flow chart representation of the unique point determination sequence of FIG. 4.

The unique point determination sequence involves determining whether an on-cam data point is "unique" (i.e., whether an index test has been performed previously for, or close to, that on-cam data point), and is described in detail with reference to FIG. 6. It will be noted that the "uniqueness" test allows unattended operation of the index test box apparatus 52 over long periods of time, while preventing continuous exercising of the gates 17 and blades 15 if the turbine dwells at the same gateblade operating point for an extended period of time (and thereby decreasing wear on the mechanical parts of the system).

The first step (300) of the unique point determination sequence entails setting the value of the indicator POINT to zero. Next, at step 301, values of headwater level, tailwater level and gate position for the on-cam data point are inserted into an array. Using this data, the microprocessor (at step 302), identifies the particular "uniqueness window" (set during calibration) in which the on-cam data point lies. Having identified the particular "uniqueness window" in which the data point lies, the microprocessor 53 then searches its long-term memory 59 to determine whether measurements for another on-cam data point lying within that same "window" have already been taken and stored (step 303). If another on-cam data point has been previously tested for the identified "uniqueness window", the unique point determination sequence ends with the value of the indicator POINT still equal to zero (indicating that the on-cam data point is not "unique"). However, if there is no other on-cam data point for the identified "uniqueness window" stored in long-term memory, the value of the indicator POINT is set equal to one (step 304), indicating that the point is "unique".

Reverting to FIG. 4, the succeeding step (107) entails looking at the value of the indicator POINT. If POINT = 0 (i.e., the on-cam data point was not "unique"), then the program reverts back and the index test box continues its search for a "unique" on-cam data point. If, at step 107, the on-cam data point was "unique" (i.e., POINT = 1), however, then the test control and blade positioning sequence is initiated (step 108).

The test control and blade positioning sequence, described in detail with reference to FIG. 7, involves moving the blades 15, by means of the index test box apparatus 52, to a new tilt angle so that, after the governor 50 has moved the gates 17 in order to maintain the desired power generation level, measurements of the aforementioned turbine operating parameters can be taken at a new gate-blade operating point. The efficiency for the new gate-blade operating point is also computed and stored, and, after a sufficient number of operating points are measured, an operating point of peak power generating efficiency (i.e., the optimal gate-blade operating point for the desired power generation level) is located.

At step 400, the microprocessor 53 checks whether the current test is to be cancelled (i.e., whether the value of the control variable MODE is "F"). If MODE = F, the current index test is cancelled and the blades 15 are returned to the on cam blade position. On the other hand, if the current index test is not to be cancelled, the value of the indicator POINT is checked (step 401). If POINT = 1, indicating that the turbine is operating on-cam, the data location pointer for the array is set (step 422) and a control variable SETPOINT (which is used to specify the desired blade tilt angle) is assigned a value corresponding to the on-cam blade position (step 403). At step 404, on-cam values of linear rise blade cam position, blade position, gate position and grosshead are stored in the array.

Next (step 405), two other control variables (namely, DIR and DIRECTION) are assigned initial values. The control variable DIR specifies the direction in which testing is proceeding (i.e., whether operating points having blade tilt angles steeper or flatter than the "on-cam" blade tilt angle are being tested). When DIR has a value of "A", testing is proceeding in the steeper blade tilt angle direction, whereas when DIR has a value of "B", testing is proceeding in the flatter blade tilt angle direction. The indicator DIRECTION is used to indicate the extent to which the tests necessary to locate a peak efficiency operating point have been satisfied. For example, when DIRECTION = 0, tests have been satisfied in neither the steeper blades direction nor the flatter blades direction. In contrast, when DIRECTION = 2, peak efficiency point location tests have been satisfied in the steeper blades direction, and when DIRECTION = 4, peak efficiency point location tests have been satisfied in both the steeper and the flatter blades directions. Finally, DIRECTION = 100 when the index test sequence is completed. At step 405, the control variable DIR is assigned a value of "A" (indicating that measurements are proceeding in the steeper blade tilt angles direction) and the indicator DIRECTION is set equal to 0. Then, at step 406, the manipulation field of the data array is cleared. It will be noted that for all gate-blade operating points measured other than the on-cam data point (i.e., for POINT ≠ 1), steps 402–406 of the test control and blade positioning sequence are skipped.

In steps 407–410, the value of the control variable DIR is checked and the array pointer is incremented (if DIR equal "A") or decremented (if DIR equal "B"). Next, the most recently measured data point information is moved to the manipulation field of the array, and located in the data slot specified by the array pointer. As mentioned previously, the manipulation field 56 has a predetermined number of data slots (e.g., 22), and the on-cam data point information is preferably stored at the middle of the manipulation field. Subsequently collected data point information is located in the manipulation field data slots according to the blade tilt angle corresponding thereto. For steeper blade tilt angles, the information is stored in data slots thirteen through twenty-two (with the information corresponding to the steepest blade tilt angle being in slot number twenty-two), while data point information for flatter blade tilt angles is stored in data slots one through eleven (with the information corresponding to the flattest blade tilt angle being in data slot number one).

The microprocessor 53 caluulates values of flow, energy in and energy out for the most recently measured data point at step 412. Flow is equal to the square root of the pressure drop measured by the differential pressure transducer 40 across the Winter-Kennedy taps 39, applying a scaling constant for cubic feet per second. The calibration constant for this equation in the index test box is actually 10% of the flow at 100% generation. Energy input to the turbine is computed using the following equation:

$$\text{energy in} = (\text{flow} * 62.4 * \text{grosshead})/550$$

where 62.4 equals the weight of a cubic foot of water (lbs/ft$^3$), grosshead equals headwater level minus tailwater level (ft.), and 550 is a foot-pounds per second to horsepower conversion factor.

The measurement of power output from the generator is tapped from watt transducer 19 provided for the governor, and this signal is converted to a value (energy out) in horsepower by a well-known equation:

$$\text{energy out} = (W_{out} * V)/745.4$$

where $W_{out}$ equal the level read from the watt transducer amplifier (indicated on scale of 0 to 1, corresponding to 0 to 100%, of full output), V equals the full output value of the generator (in watts), 745.4 is a watts to horsepower conversion factor.

Next, at step 413, the microprocessor 53 computes and stores the efficiency value for the data point being considered. The microprocessor computes the value of efficiency using the equation:

$$\text{efficiency} = \text{energy out}/\text{energy in}.$$

The value of the indicator POINT is evaluated at step 414, and if POINT=2 or POINT=, the control variable SETPOINT is increased (at step 415) by a predetermined step (the size of the incremental step is set during calibration, and will translate into a desired alteration of the blade tilt angle, e.g., 1 or 2% of the on-cam blade tilt angle). If, at step 414, the value of the indicator POINT is not 2 or 3, the value of the control variable SETPOINT is not altered.

The value of the indicator POINT is again checked at step 416, and if, and only if, POINT has a value greater than 3 (i.e., if measurements have been taken for at least three data points), the decision subsequence is called (step 417).

The decision subsequence compares stored efficiency values in order to locate a peak efficiency operating point, and in so doing, determines whether additional data points in either the steeper or flatter blade direction must be measured. This subsequence is described in detail with reference to FIG. 8. If POINT=4 at step 500 (i.e., if this is the first pass through the decision subsequence), the value of the control variable DIR is set as "A" (step 501) to indicate that testing is proceeding in the steeper blade tilt angle direction. At step 502, the value of the control variable DIR is evaluated to deterine the direction in which testing is proceeding. If DIR equal "A" (i.e., if testing is proceeding in the steeper blade tilt angle direction), the memory pointer is set to the start of the manipulation field (step 503) and is then incremented through the manipulation field to the first data location p (step 504). Thus, for example, when POINT=4, there is data point information stored in only data slots eleven through fourteen of the manipulation field, so that the value of p (i.e., the first data location) is 11. The indicator DIRECTION is set to 0 at step 505, and the efficiency value stored at the first data location (p) is comaared to the efficiency value stored at the second data location (p+1) (step 506). If the efficiency value stored at the first data location exceeds the efficiency value stored at the second data location by a threshhold value (T) set during calibration, (e.g., 0.25%), then the indicator DIRECTION is set equal to 1 (step 507); otherwise, the value of the indicator DIRECTION remains equal to 0. At step 508, the efficiency value stored at the second data location (p+1) is compared with the efficiency value stored at the third data location (p+2). If the efficiency value stored at the second data location exceeds the efficiency value stored at the third data location by the threshhold value (T), then the indicator DIRECTION is incremented by one; otherwise, the value of the indicator DIRECTION remains the same.

The value of the indicator DIRECTION is checked at step 510 to determine whether the peak efficiency location test has been satisfied in the steeper blades direction (i.e., whether DIRECTION=2). If the test is not satisfied, the value of p is incremented (step 511), and a check is made as to whether there is a data point in the data slot p+2 in the manipulation field (step 512). If there is a data point at the new location p+2, the test reverts to step 505 and once again begins comparing efficiency values. If, at step 512, there is not a data point at the location p+2, the control variable SETPOINT is incremented by a predetermined step (step 513), and the decision subsequence ends. Once enough data points have been measured to identify an optimal (i.e., peak efficiency) operating point and a plurality of other adjacent operating points defining a corresponding series of efficiency value steps such that, in the steeper blade angle direction, there are, receding from the optimal point, at least two consecutive decreasing efficiency value steps, the value of the indicator DIRECTION, at step 510, will be equal to 2. Then, the value of the control variable SETPOINT is changed to specify a blade position which is one incremental step flatter than the on-cam position (step 514), and the value of the control variable·DIR is set as "B" (step 515) to indicate that testing will now proceed in the flatter blade angle direction.

At step 502 in the decision subsequence, if determined that testing is proceeding in the flatter blade direction (i.e., if DIR equal "B"), the value of the indicator DIRECTION is set equal to 2 (step 516), and the memory pointer is reset to the start of the manipulation field (step 517) and incremented through the manipulation field to the first data location (p) (step 518). Steps 519 through 527 of the decision subsequence are substantially identical to steps 506 through 513 of the decision subsequence (except that they are designed to identify two consecutive decreasing efficiency value steps in the flatter blade direction), and therefore, will not be described in detail. Once two consecutive decreasing efficiency value steps are identified in the flatter blade direction, the value of the indicator DIRECTION will be 4 (step 523), indicating that a peak efficiency operating point has been located. The value of the indicator DIRECTION is then set equal to 100 (step 528) to indicate that this individual index test is completed, and the decision subsequence ends.

Reverting to step 418 of the test control and blade positioning sequence (FIG. 7), the microprocessor considers whether the measured grosshead for the relevant operating point is within a 5% band around the on-cam grosshead. If it is, the current index test proceeds; otherwise, the value of the indicator DIRECTION is set equal to 100 (step 419) to indicate that the index test should be cancelled.

The value of the indicator DIRECTION is checked at step 420, and if it is equal to 100 (indicating that the index test should be cancelled or is complete), the value of the control variable SETPOINT is set to specify a blade angle which corresponds with the on-cam blade position (step 421); otherwise, the value of the control variable SETPOINT remains unchanged. At step 422, a determination is made as to whether the value of the control variable SETPOINT is within predetermined physical limits of the hardware. The pitch of the blades can only be set within a window entered during calibration (typically ±20% of the on-cam position). If the value of the control variable SETPOINT exceeds this window, the computer system will produce an error signal and the control variable MODE will be set equal to "F" (step 423) indicating that the current index test should be cancelled.

At step 424, the blades 15 are moved to the new pitch angle specified by the value of the control variable SETPOINT generated by the microprocessor (and translated into an analog stepping motor control signal $V_{sm}$). By monitoring the feedback signal $V_{ab}$ (corresponding to the actual blade position) generated by the transducer 44 connected to the blade restoring shaft 35, and by adjusting its output signal $V_{sm}$, the microprocessor ensures that the blades are accurately positioned at the new desired blade tilt angle The value of the control variable MODE is again checked at step 425, and if its value indicates that the current index test is to be cancelled (i.e., if MODE equal "F"), the control variable SETPOINT is assigned a value specifying a blade angle corresponding to the on-cam blade position, the indicator DIRECTION is set equal to 100 (indicating that the current index test is cancelled), and the control variable MODE is assigned a value "V" (indicating that the index test has been cancelled and the program execution is to return to the operator interface step (102)). If, however, at step 425, the value of the control variable MODE does not indicate that the current test has been cancelled, the indicator POINT is incremented (step 427), and a check is made of the value of the indicator DIRECTION (step 428). If the indicator DIRECTION does not have a value of 100, the test control and blade positioning sequence ends, and the current index test continues. On the other hand, if the indicator DIRECTION does have a value of 100 (indicating that the current index test is cancelled or completed), both of the indicators POINT and DIRECTION are set to 0 (step 429), and all of the data located in the manipulation field of the array is transferred to long term memory, and when this memory area is full, or at the operator's discretion, the data is all stored (at step 430) on suitable electronic media, such as EPROM chips. After all of the data has been stored, the manipulation field of the array is cleared (step 431).

Finally, reverting to step 109 of the main program (FIG. 4), the microprocessor 53 checks the value of the control variable MODE to determine whether the index test should be cancelled. Thus, if the value of the control variable MODE equal "V" (i.e., if the index test has been cancelled), the indicator POINT is set equal to 0 (step 110), and the program then returns to step 102 so that the operator can check and/or change any of the calibration values. If, at step 109, the value of the control variable MODE does not specify that the index test has been cancelled, the test continues (at step 103) by beginning another steady-state determination sequence.

The following hypothetical measurement sequence will serve to further describe the inventive method used by the automatic index test box apparatus to automatically determine the optimal angle (providing peak generating efficiency) for the variable pitch blades 15 of a Kaplan-type turbine. Upon locating an on-cam operating point which is steady-state and unique (POINT=1), the microprocessor 53 (following steps 401-413 of the test control and blade positioning sequence) stores operating parameter data and the efficiency value (assume 93%) corresponding to the on-cam point in data slot number eleven of the manipulation field. SETPOINT remains the same (step 414) and the decision subsequence is skipped (step 416) because POINT=1, and therefore the blade tilt angle remains the same (step 424). POINT is incremented to a value of 2 (step 427) and the program reverts to step 103 where steady-state operation is again monitored. Thereafter, following steps 407-413, operating parameter data and the efficiency value (again approximately 93% because the blades have not moved) are stored in data slot number twelve of the manipulation field. SETPOINT is then increased (steps 414-415) to specify a steeper blade tilt angle, the decision subsequence is again skipped (step 416), the blades are moved (step 424), and incrementation makes POINT=3 (step 427).

For the new gate-blade operating point, steady-state operation is determined (step 103) and operating parameter data and the efficiency value (assume 94%) is stored in data slot number thirteen of the manipulation field. SETPOINT is again increased to move the blaees to a steeper angle, and incrementation sets POINT=4.

A similar sequence is followed with data (assume efficiency=93.5%) stored in slot fourteen of the manipulation field. This time, however, the decision subsequence is called (step 417) because POINT>3. Since testing is proceeding in the steeper blade angles direction (i.e., DIR=A), only steps 503-514 of the decision subsequence are accessed. The first data location is slot number eleven, so p=11 initially. However, $Eff_{11}$ (93%) is not greater than $Eff_{12}+T$ (i.e., 92+0.25%), and $Eff_{12}$ (93%) is not greater than $Eff_{13}+T$ (94.25%), so DIRECTION=0 at step 510. The memory pointer is incremented at step 511 (i.e., p=12), and it is verified at step 512 that there is data stored in slot number fourteen (p+2). Therefore, steps 505-510 are repeated. Again, however, DIRECTION ≠2 at step 510, so the memory pointer must be incremented to p=13. There is no data in slot number fifteen (p+2) though (step 512), and therefore SETPOINT must be incremented again (step 513). The blades are then moved to a new steeper angle (step 424), incrementation sets POINT=5 (step 427), and operating parameter data and the efficiency value (assume 93%) is measured for the new gate-blade operating point and stored in data slot number fifteen of the manipulation field.

The decision subsequence is again called at step 417 (because POINT >3), and this time, whnn p=13, it is found that $Eff_{13}$ (94%) is greater than $Eff_{14}+T$ (93.75%) and $Eff_{14}$ (93.5%) is greater than $Eff_{15}+T$ (93.25%). Accordingly, DIRECTION=2 at step 510, and the value of SETPOINT is set to specify a blade angle which is one incremental step flatter than on-cam (step 514), and the control variable DIR is assigned a value "B" (step 515) to indicate that the test is satisfied in the steeper blade angles direction and that testing should now proceed in the flatter blade angles direction.

Assuming that for POINT=6 (i.e., the first operating point measured in the flatter blade angles direction) the efficiency value is 92.5% (which is written in data slot number eleven, overriding the original "on-cam" data), and that for POINT=7 the efficiency value is 92% (stored in data slot number ten), it will be seen that the test sequence will now be satisfied in the flatter blade angles direction also (since for p=10, $Eff_{10}+T$ (92.25%) is less than $Eff_{11}$ (92.5%) and $Eff_{11}+T$ (92.75%) is less than $Eff_{12}$ (93%)). Thus, at step 523, DIRECTION=4. DIRECTION is then set equal to 100 (step 528), indicating that the index test about the unique on-cam point is completed. All of the data stored in the manipulation field 56 is then transferred to long term memory for later storage on a suitable electronic medium, such as an EPROM chip (step 430), and the index test box apparatus 52 begins searching (at step 103) for a new on-cam operating point to test.

Using the information collected by the index test box apparatus, and stored on one or more EPROM chips, a plot can be made in Cartesian coordinates of gate position versus blade position. The individual test points are plotted, and all points having the same power generation level are connected by lines. Since the index test box collects all data at a constant generation level, a curved line (identified as a cosstant generation line) will be made through each data set. To determine the optimum blade cam line, a second set of lines are constructed which connect all data points that have the same efficiency value. These lines will form concentric whorls. The best gate-blade line (for a given head level) is then selected by drawing a line through the centers of the highest efficiency whorls. To determine the entire 3D cam surface, results from several test (collected at different head levels) are combined.

As can be seen from the foregoing detailed description, the present invention provides a method and apparatus for automatically identifying, for each gross headwater level and gate position, the optimal operating angle (providing peak generating efficiency) for the blades of a Kaplan-type turbine, thus eliminating the extensive manpower required to perform a classical index test. Moreover, the tests are run while the turbine is on-line, and at a constant power generation level, so that water level stabilization time is decreased and delays from having to correlate changes in power output with the power dispatcher are eliminated.

What is claimed is:

1. Method of automatically determining, for a plurality of gross headwater levels and gate positions, optimal operating angles providing peak generating efficiency for variable pitch blades of a Kaplan-type turbine having movable gates, said turbine being controlled by a governor and an electronic 3D cam, said method comprising the steps of:

running the turbine on-cam at, and usnng the governor to control the positions of said gates so as to maintain said turbine at, a predetermined setpoint power generation level;

measuring on-cam values of particular operating parameters of the turbine;

evaluating the measured data to determine whether the turbine is operating in a steady-state condition;

when steady-state operation has been achieved, moving the blades of said turbine through a series of incremental off-cam variations in pitch in both flatter blade angle and steeper blade angle directions;

after making each incremental variation in the pitch of said blades, allowing the governor to reposition the gates so as to return the power generation level of the turbine to the setpoint, monitoring the operation of the turbine to determine when it has returned to steady-state and then measuring values of the particular operating parameters at the new gate-blade operating point;

computing an efficiency value corresponding to each of the measured operating points; and comparing the efficiency values of the measured operating points to identify a peak value.

2. The method of claim 1, wherein steady-state operating condition of the turbine at an operating point is determined by taking a plurality of sets of measurements of each operating parameter at the operating point, each period of time for taking a set of measurements being separated from the other periods by at least a predetermined delay period; computing, for each set, the individual set average value and standard deviation for each parameter and verifying that steady-state has been achieved when one of these computed individual set standard deviations exceed a first set of predetermined limits; and finally, as a second level, computing the average value and standard deviation of the computed individual set average values for each parameter and verifying that steady-state has been achieved when none of these second-level computed standard deviations exceed a second set of predetermined limits.

3. The method of claim 1, wherein multi-rate sampling techniques are used to measure values of the particular operating parameters.

4. The method of claim 1, wherein the pitch of the blades is varied up to 20% on either side of the on-cam position.

5. The method of claim 1, wherein off-cam incrementation of the pitch of the blades, and the governor-controlled repositioning of the gates, monitoring of steady-state operation, measurement of particular operating parameters and computation of efficiency, are discontinued when an optimal operating point and a plurality of other adjacent operating points are identified which define a corresponding series of efficiency value steps such that on both the flatter-blade-angle and steeper-blade-angle sides of the optimal point there are, receding from the optimal point, at least two consecutive decreasing efficiency value steps.

6. The method of claim 1, wherein the particular operating parameters being measured include headwater level, tailwater level, gate position, blade position, water flow, power generation and the blade position specified by the 3D cam.

7. The method of claim 6, wherein the headwater and tailwater levels are measured by means of pressure transducers which are positioned in the water flow path of the turbine and are located before the turbine inlet and after the turbine outlet, respectively.

8. The method of claim 6, wherein the water flow is determined by means of a differential pressure transducer across a pair of Winter-Kennedy taps located in a spiral flow case through which water flows to the gates and blades of the turbine.

9. The method of claim 6, wherein power generation is measured by means of a watt transducer.

10. The method of claim 6, wherein the gate position is measured by means of a potentiometer coupled to the gates.

11. The method of claim 10, wherein gate position is further measured by means of a transducer installed on a gate servo, and wherein hysteresis in the governor feedback system is determined by comparing the difference between the gate servo transducer and the gate potentiometer.

12. The method of claim 6, wherein blade position is measured by means of a transducer coupled to an oil head of a blade servo.

13. The method of claim 12, wherein the blade position specified by the 3D cam is measured by means of a potentiometer coupled to a stepping motor which moves the blades, and wherein hysteresis of the turbine and accuracy of the blade positioning system may be determined by comparing the difference between the oil head transducer and the blade position specified by the electronic 3D cam.

14. Method of automatically determining, for a plurality of gross headwater levels and gate positions, optimal operating angles providing peak generating efficiency for variable pitch blades of a Kaplan-type turbine having movable gates, said turbine being controlled by a governor and an electronic 3D cam, said method comprising the steps of:

running the turbine on-cam at, and using the governor to control the positions of said gates so as to maintain said turbine at, a predetermined setpoint power generation level;

measuring nn-cam values of particular operating parameters of the turbine;

evaluating the measured data to determine whether the turbine is operating in a steady-state condition;

when steady-state operation has been achieved, comparing the measured on-cam data with data compiled in a memory of a microprocessor to identify unique on-cam operating points;

upon identifying a unique on-cam operating point, making a series of incremental off-cam variations in the pitch of the blades of the turbine in both flatter blade angle and steeper blade angle directions;

after making each incremental variation in the pitch of the blades, allowing the governor to reposition the gates so as to return the power generation level of the turbine to the setpoint, monitoring the operation of the turbine to determine when it has returned to steady-state and then measuring values of the particular operating parameters at the new gate-blade operating point;

computing an efficiency value corresponding to each of the measured operating points; and comparing the efficiency values of the measured operating points to identify a peak value.

15. The method of claim 14, wherein steady-state operating condition of the turbine at an operating point is determined by taking a plurality of sets of measurements of each operating parameter at the operating point, each period of time for taking a set of measurements being separated from the other periods by at least a predetermined delay period; computing, for each set, the individual set average value and standard deviation for each parameter and verifying tha steady-state has been achieved when none of these computed individual set standard deviations exceed a first set of predetermined limits; and finally, as a second level, computing the average value and standard deviation of the computed individual set average values for each parameter and verifying that steady-state has been achieved when none of these second-level computed standard deviations exceed a second set of predetermined limits.

16. The method of claim 14, wherein unique on-cam operating points are identified by using the measured on-cam data to select a preset uniqueness window and then verifying that no previous on-cam operating point has been measured which lies within the selected window.

17. The method of claim 14, wherein multi-rate sampling techniques are used to measure values of the particular operating parameters.

18. The method of claim 14, wherein the pitch of the blades is varied up to 20% on either side of the on-cam position.

19. The method of claim 14, wherein off-cam incrementation of the pitch of the blades, and the governor-controlled repositioning of the gates, monitoring of steady-state operation, mesurement of particular operating parameters and computation of efficiency, are discontinued when an optimal operating point and a plurality of other adjacent operating points are identified which define a corresponding series of efficiency value steps such that on both of the flatter-blade-angle and steeper-blade-angle sides of the optimal point there are, receding from the optimal point, at least two consecutive decreasing efficiency value steps.

20. The method of claim 14, wherein the particular operating parameters being measured include headwater level, tailwater level, gate position, blade position, water flow, power generation and the blade position specified by the 3D cam.

21. The method of claim 20, wherein the headwater and tailwater levels are measured by means of pressure transducers which are positioned in the water flow path of the turbine and are located before the turbine inlet and after the turbine outlet, respectively.

22. The method of claim 20, wherein the water flow is determined by means of a differential pressure transducer across a pair of Winter-Kennedy taps located in a spiral flow case through which water flows to the gates and blades of the turbine.

23. The method of claim 20, wherein power generation is measured by means of a watt transducer.

24. The method of claim 20, wherein the gate position is measured by means of a potentiometer coupled to the gates.

25. The method of claim 24, wherein gate position is further measured by means of a transducer installed on a gate servo, and wherein hysteresis in the governor feedback system is determined by comparing the difference between the gate servo transducer and the gate potentiometer.

26. The method of claim 20, wherein blade position is measured by means of a transducer coupled to an oil head of a blade servo.

27. The method of claim 26, wherein the blade position specified by the 3D cam is measured by means of a potentiometer coupled to a stepping motor which moves the blades, and wherein hysteresis of the turbine and accuracy of the blade positioning system may be determined by comparing the difference between the oil head transducer and the blade position specified by the electronic 3D cam.

28. In a system for testing a hydro-powered Kaplan-type turbine having movable blades an movable gates and which is controlled by a governor and an electronic 3D cam in response to measured values of particular operating parameters, including gross headwater level and power generation level, the improvement comprising:

an index test apparatus for automatically determining an optimal blade-to-gate positional relationship providing peak generating efficiency for a gross headwater level/power generation level operating condition, said index test apparatus comprising:

analog-to-digital converting means for converting measured analog values of the operating parameters to digital values;

memory means for storing both predetermined and measured values of the operating parameters; and microprocessor means for controlling the automatic determination of the optimal blade-to-gate positional relationships for said turbine, said microprocesor having a program for collecting measurements of the on-cam values of said operating parameters and storing said values in memory; evaluating the measured data to determine whether the turbine is operating at steady-state; when steady-state operation is achieved, moving the blades of said turbine through a series of off-cam incremental variations in pitch in both flatter blade angle and steeper blade angle directions; after making each incremental variation in the blade pitch, allowing the governor to reposition the gates as as to return the power generation level of the turbine to a predetermined setpoint, monitoring the operation of the turbine to determine when it has returned to steady-state and then measuring the values of the operating parameters at the new gate-blade operating point and storing those values in memory; computing for each gate-blade operating point a corresponding power generation efficiency value and storing that value in memory; comparing each power generation efficiency value with previously computed values which have been stored in the memory to identify a peak efficiency value and thereby define the optimal blade-to-gate positional relationship for said gross headwater level/power generation level operating condition; and, upon defining said optimal relationship, returning the turbine to on-cam operation.

29. In a system for testing a hydro-powered Kaplan-type turbine having movable blades and movable gates and which is controlled by a governor and an electronic 3D cam in response to measured values of particular operating parameters, including gross headwater level and power generation level, the improvement comprising:

an index test apparatus for automatically determining an optimal blade-to-gate positional relationship providing peak generating efficiency for a gross headwater level/power generation level operating condition, said index test apparatus comprising:

analog-to-digital converting means for converting measured analog values of the operating parameters to digital values;

memory means for storing both predetermined and measured values of the operating paramtters; and microprocessor means for controlling the automatic detemination of the optimal blade-to-gate positonal relationships for said turbine, said microprocessor having a program for collecting measurements of the on-cam values of the operating parameters and storing said values in memory; evaluating the measured data to determine whether the turbine is operating at steady-state; when steady-state operation is achieved, comparing measured values of the operating parameters with previously measured and stored values to locate unique on-cam operating points; upon locating a unique on-cam operating point, making a series of incremental off-cam variations in the pitch of the blades of the turbine in both flatter blade angle and steeper blade angle directions; after making each incremental variation in the blade pitch, allowing the governor to reposition the gates so as to return the power generation level of the turbine to a predetermined setpoint, monitoring the operation of the turbine to determine when it has returned to steady-state and then measuring the values of the operating parameters at the new gate-blade operating point and storing those values in memory; computing for each gate-blade operating point a corresponding power generation efficiency value and storing that value in memory; comparing each power generation efficiency value with previously computed values which have been stored in the memory to identify a peak efficiency value and thereby define the optimal blade-to-gate positional relationship for said gross headwater level/power generation level operating condition; and, upon defining said optimal relationship, returning he turbine to on-cam operation.

* * * * *

UNITED STATES PATENT AND TRADEMARK OFFICE
CERTIFICATE OF CORRECTION

PATENT NO. : 4,794,544

DATED : December 27, 1988

INVENTOR(S) : Douglas J. Albright and George H. Mittendorf, Jr.

It is certified that error appears in the above-identified patent and that said Letters Patent is hereby corrected as shown below:

On cover page, in "OTHER PUBLICATIONS", col. 2, line 3, "Metod" should be --Method--.

In the Specification:

Col. 3, line 58, "chambrr" should be --chamber--.

Col. 4, line 8, "rre" should be --are--;
line 63, "turbiee" should be --turbine--.

Col. 6, line 23, "mantain" should be --maintain--;
line 63, "CYCL))" should be --CYCLE)--.

Col. 7, line 63, "compard" should be --compared--;
line 68, "connter" should be --counter--.

Col. 9, line 45, "422" should be --402--.

Col. 10, line 33, "caluulates" should be --calculates--.

Col. 11, line 2, "POINT=," should be --POINT=3,--;
line 26, "deterine" should be --determine--;
line 37, "comaared" should be --compared--.

Col. 14, line 2, "blaees" should be --blades--;
line 29, "whnn" should be --when--;
line 65, "cosstant" should be --constant--.

In the Claims:

Claim 1, col. 15, line 27, "usnng" should be --using--.

Claim 15, col. 17, line 31, "tha" should be --that--.

Claim 28, col. 18, line 65, "as as" should be --so as--.

UNITED STATES PATENT AND TRADEMARK OFFICE
CERTIFICATE OF CORRECTION

PATENT NO. : 4,794,544

DATED : December 27, 1988

INVENTOR(S) : Douglas J. Albright et al

It is certified that error appears in the above-identified patent and that said Letters Patent is hereby corrected as shown below:

Claim 29, col. 19, line 31, "paramtters" should be --parameters--.

Signed and Sealed this

Twentieth Day of June, 1989

Attest:

DONALD J. QUIGG

Attesting Officer

Commissioner of Patents and Trademarks